(12) United States Patent
Medford et al.

(10) Patent No.: US 8,412,774 B2
(45) Date of Patent: Apr. 2, 2013

(54) PICTURE-IN-PICTURE VIDEO CONTENT DISTRIBUTION

(75) Inventors: Brad Medford, Austin, TX (US); Dinesh Nadarajah, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 496 days.

(21) Appl. No.: 11/541,362

(22) Filed: Sep. 28, 2006

(65) Prior Publication Data
US 2007/0256111 A1 Nov. 1, 2007

Related U.S. Application Data

(60) Provisional application No. 60/746,027, filed on Apr. 29, 2006.

(51) Int. Cl.
*G06F 15/16* (2006.01)
(52) U.S. Cl. ........ 709/205; 705/206; 705/207; 705/208; 705/209; 725/86; 725/87; 725/101; 725/105; 725/106
(58) Field of Classification Search .................. 709/205, 709/206, 208, 209
See application file for complete search history.

(56) References Cited

U.S. PATENT DOCUMENTS

| 5,517,588 | A | 5/1996 | Kondo |
| 5,657,092 | A | 8/1997 | Kim |
| 6,081,297 | A | 6/2000 | Lee |
| 6,563,876 | B2 * | 5/2003 | Boyce et al. ............. 375/240.15 |
| 6,680,754 | B1 | 1/2004 | Yim |
| 2001/0008427 | A1 | 7/2001 | Seo |
| 2002/0001343 | A1 * | 1/2002 | Challapali et al. ....... 375/240.01 |
| 2003/0133515 | A1 | 7/2003 | Kondo |
| 2004/0168185 | A1 * | 8/2004 | Dawson et al. .................. 725/38 |
| 2006/0064716 | A1 * | 3/2006 | Sull et al. .......................... 725/37 |
| 2006/0268012 | A1 * | 11/2006 | MacInnis et al. .............. 345/629 |
| 2010/0046912 | A1 * | 2/2010 | Ikeda et al. ..................... 386/71 |

FOREIGN PATENT DOCUMENTS

WO WO-2007133385 A2 11/2007

OTHER PUBLICATIONS

Mochida, et al., "The i-Visto Gateway XGA Uncompressed HDTV Multiple Transmission Technology for 10-Gbit/s Networks", The i-Visto Gateway XGĀ???Uncompressed HDTV Multiple Transmission Technology for 10-Gbit/s Networks,6 pgs.
International Application Serial No. PCT/US2007/009704, International Search Report mailed Jun. 11, 2008, 4 pgs.
International Application Serial No. PCT/US2007/009704, Written Opinion mailed Jun. 11, 2008, 4 pgs.

* cited by examiner

*Primary Examiner* — Kenny Lin
*Assistant Examiner* — Abdelnabi Musa
(74) *Attorney, Agent, or Firm* — Guntin & Gust, PLC; Ed Guntin

(57) ABSTRACT

A method and system for multicasting video signals over a network. A standard definition (SD) picture-in-picture (PIP) multicast video signal is encoded from a video signal. A common network address is assigned to the SD PIP multicast video signal for both SD PIP video content and high definition (HD) video content.

23 Claims, 8 Drawing Sheets

PICTURE-IN-PICTURE VIDEO CONTENT DISTRIBUTION

CROSS-REFERENCE TO RELATED APPLICATION

This application claims the benefit of United States Provisional Patent Application entitled "PICTURE-IN-PICTURE (PIP) SIGNAL TRANSMISSION AND REPRODUCTION", Ser. No. 60/746,027, Filed 29 Apr. 2006, the entire contents of which is herein incorporated by reference.

FIELD

This application relates to a method and system to a television distribution system, and more specifically to systems and methods for use with providing picture-in-picture video content used in a television distribution system.

BACKGROUND

Cable, satellite and Internet Protocol Television (IPTV) systems typically employ a Set-Top Box (STB) unit that is connected to the source of programming and also provides one or more signals for input to television or other viewing devices. A STB unit typically allows a subscriber to select programming to view or to avail themselves of other features or services. Such features or services may include television programming, on-demand programming, and/or digital video recorder (DVR) capabilities, which may be incorporated in the STB.

Viewers of televisions and other viewing devices may desire to view more than one video signal simultaneously. Instead of splitting the screen into multiple equal portions, a reduce size image, such as a picture-in-picture (PIP), is presented within the image of the primary video signal being observed. In networks where bandwidth is limited, such as during the delivery of high definition (HD) video signals, signal service providers may seek to reduce bandwidth that is allocated to the sending of various signals.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Figure 1:
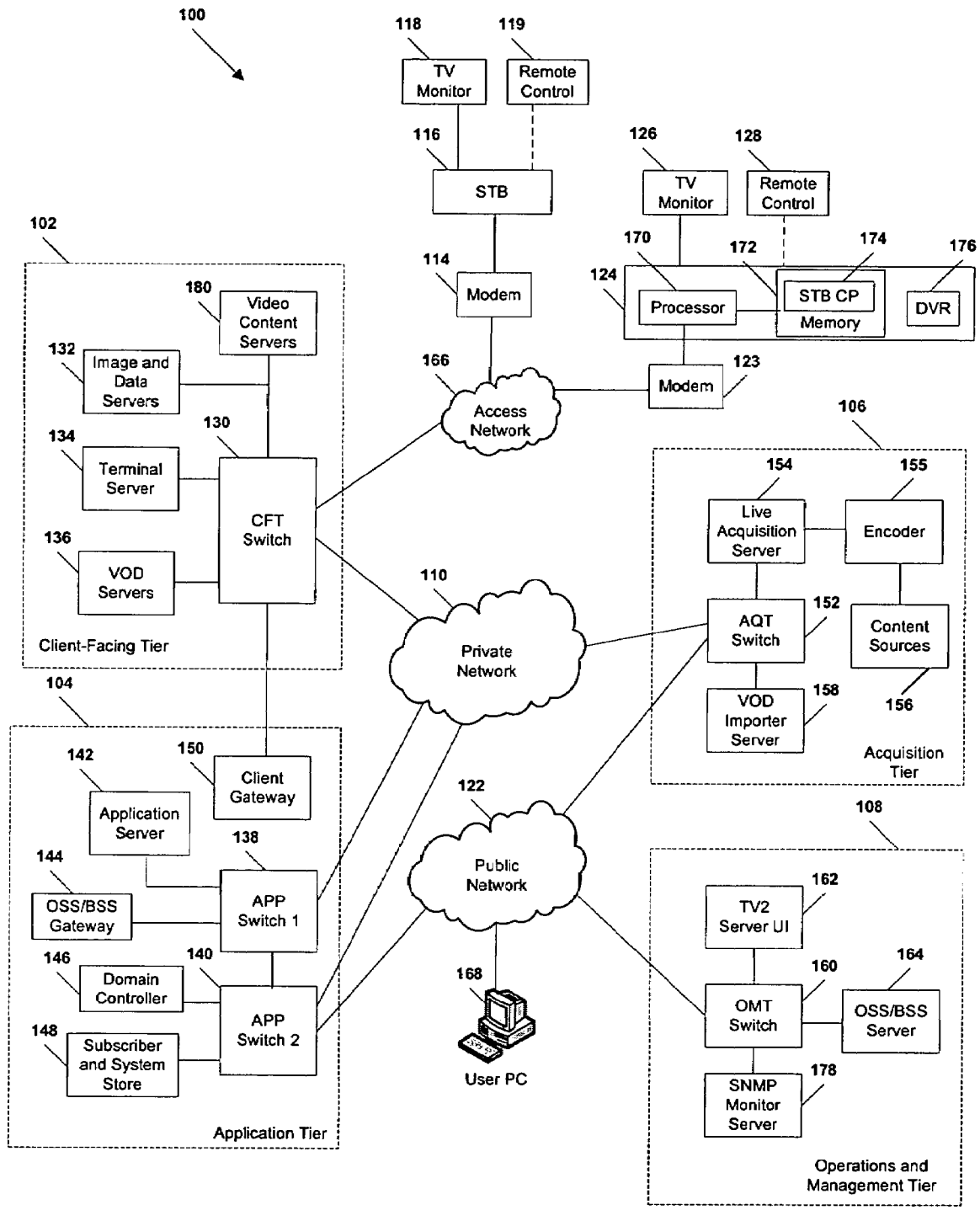
FIG. 1 illustrates a diagrammatic representation of an Internet Protocol Television (IPTV) system that may be used to provide video content used in an example embodiment.

Referring to FIG. 1, an illustrative embodiment of an Internet Protocol Television (IPTV) system that may be used to provide video content is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

As illustrated in FIG. 1, the client-facing tier 102 can communicate with user equipment via a private access network 166, such as an Internet Protocol Television (IPTV) access network. In an illustrative embodiment, modems, such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes, such as the representative set-top boxes 116, 124, over a wide geographic area, such as a regional area, a metropolitan area, a viewing area, a designated market area or any other suitable geographic area, market area, or subscriber or customer group that can be supported by networking the client-facing tier 102 to numerous set-top box devices. In an illustrative embodiment, the client-facing tier, or any portion thereof, can be included at a video head-end office.

In a particular embodiment, the client-facing tier 102 can be coupled to the modems 114, 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the private access network 166, via an IPTV software platform, such as Microsoft® TV IPTV Edition. In another embodiment, representative set-top boxes 116, 124 can receive data from private access network 166 through RF and other cable and/or satellite based networks.

Additionally, the first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device can communicate with a second remote control 128.

In an example, non-limiting embodiment, each set-top box device 116, 124 can receive video content, which may include video and audio portions, from the client-facing tier 102 via the private access network 166. The set-top boxes 116, 124 can transmit the video content to an external display device, such as the television monitors 118, 126. Further, the set-top box devices 116, 124 can each include a STB processor, such as STB processor 170, and a STB memory device, such as STB memory 172, which is accessible to the STB processor 170. In one embodiment, a computer program, such as the STB computer program 174, can be embedded within the STB memory device 172. Each set-top box device 116, 124 can also include a video content storage module, such as a digital video recorder (DVR) 176. In a particular embodiment, the set-top box devices 116, 124 can communicate commands received from the remote control devices 120, 128 to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more image and data servers 132 that store still images associated with programs of various IPTV channels. The image and data servers 132 can also store data related to various channels, e.g., types of data related to the channels and to programs or video content displayed via the channels. In an illustrative embodiment, the image and data servers 132 can be a cluster of servers, each of which can store still images, channel and program-related data, or any combination thereof. The CFT switch 130 can also be coupled to a terminal server 134 that provides terminal devices with a connection point to the private network 110. In a particular embodiment, the CFT switch 130 can also be coupled to a video-on-demand (VOD) server 136 that stores or provides VOD content imported by the IPTV system 100. The client-facing tier 102 can also include one or more video content servers 180 that transmit video content requested by viewers via their set-top boxes 116, 124. In an illustrative, non-limiting embodiment, the video content servers 180 can include one or more multicast servers.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the private access network 166, which enable the set-top box devices 116, 124 to provide functions, such as display, messaging, processing of IPTV data and VOD material, etc. In a particular embodiment, the OSS/BSS gateway 144 includes operation systems and support (OSS) data, as well as billing systems and support (BSS) data. In one embodiment, the OSS/BSS gateway can provide or restrict access to an OSS/BSS server 164 that stores operations and billing systems data.

Further, the second APP switch 140 can be coupled to a domain controller 146 that provides web access, for example, to users via the public network 112. For example, the domain controller 146 can provide remote web access to IPTV account information via the public network 112, which users can access using their personal computers 168. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly with the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116, 124 can access the IPTV system 100 via the private access network 166, using information received from the client gateway 150. In this embodiment, the private access network 166 can provide security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when the first representative set-top box device 116 accesses the system 100 via the private access network 166, the client gateway 150 can verify subscriber information by communicating with the subscriber and system store 148 via the private network 110, the first APP switch 138, and the second APP switch 140. Further, the client gateway 150 can verify billing information and status by communicating with the OSS/BSS gateway 144 via the private network 110 and the first APP switch 138. In one embodiment, the OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, e.g., because it is connected to an unauthorized twisted pair, the client gateway 150 can block transmissions to and from the set-top box device 116 beyond the private access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television or movie content, for example, from content sources 156 through an encoder 155. In a particular embodiment during operation of the IPTV system, the live acquisition server 154 can acquire television or movie content. The live acquisition server 154 can transmit the television or movie content to the AQT switch 152, and the AQT switch 152 can transmit the television or movie content to the CFT switch 130 via the private network 110.

Further, the television or movie content can be transmitted to the video content servers 180, where it can be encoded, formatted, stored, or otherwise manipulated and prepared for communication to the set-top box devices 116, 124. The CFT switch 130 can communicate the television or movie content to the modems 114, 122 via the private access network 166. The set-top box devices 116, 124 can receive the television or movie content via the modems 114, 122, and can transmit the television or movie content to the television monitors 118, 126. In an illustrative embodiment, video or audio portions of the television or movie content can be streamed to the set-top box devices 116, 124.

Further, the AQT switch can be coupled to a video-on-demand importer server 158 that stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When user issue requests for VOD content via the set-top box devices 116, 124, the requests can be transmitted over the private access network 166 to the VOD server 136, via the CFT switch 130. Upon receiving such requests, the VOD server 136 can retrieve the requested VOD content and transmit the content to the set-top box devices 116,124 across the private access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 170 that monitors network devices within or coupled to the IPTV system 100. In a particular embodiment, the OMT switch 160 can communicate with the AQT switch 152 via the public network 112.

In an illustrative embodiment, the live acquisition server 154 can transmit the television or movie content to the AQT switch 152, and the AQT switch 152, in turn, can transmit the television or movie content to the OMT switch 160 via the public network 112. In this embodiment, the OMT switch 160 can transmit the television or movie content to the TV2 server 162 for display to users accessing the user interface at the TV2 server 162. For example, a user can access the TV2 server 162 using a personal computer (PC) 168 coupled to the public network 112.

Figure 2:
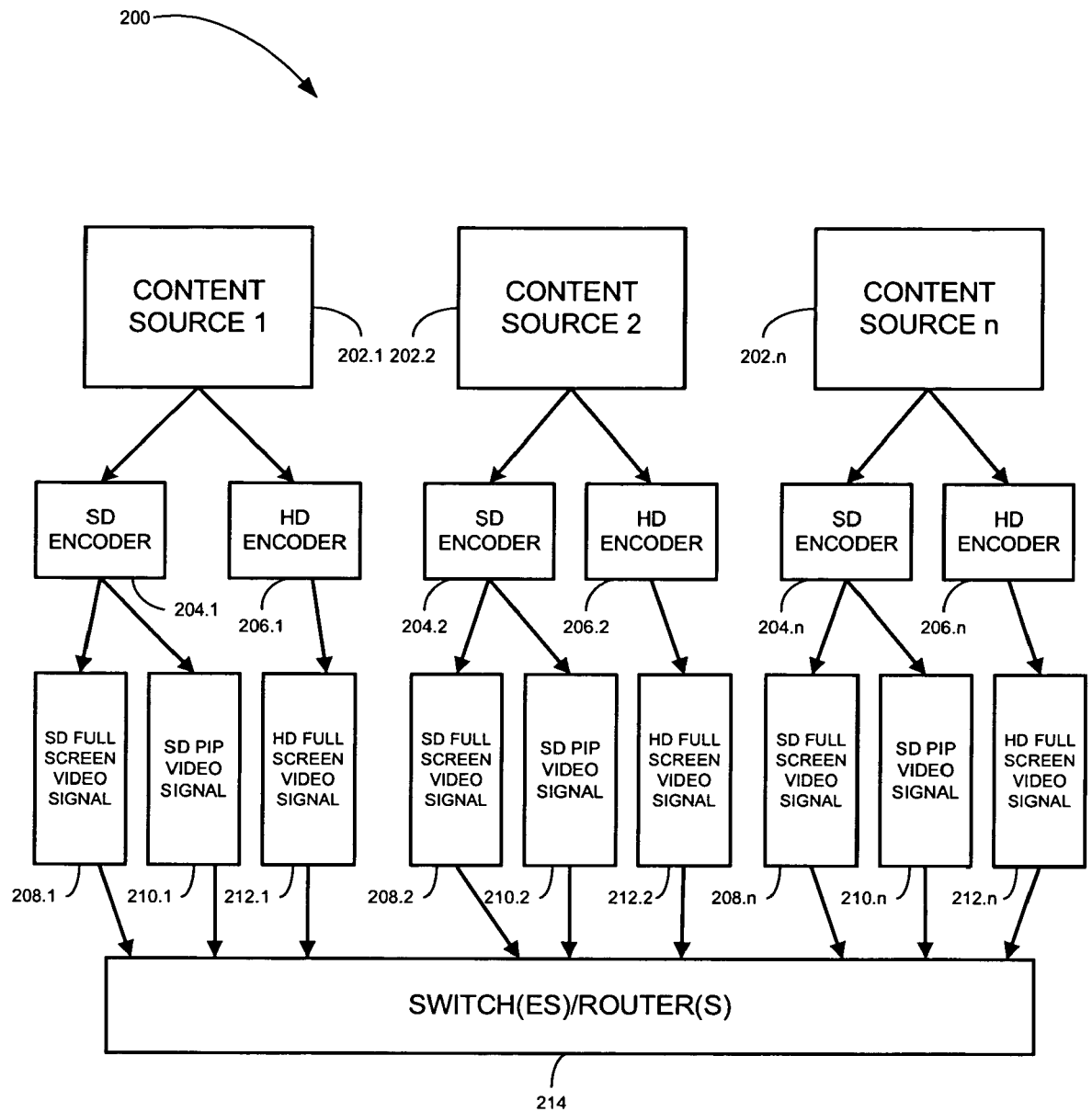
FIG. 2 is a block diagram of an acquisition tier according to an example embodiment.

Referring to FIG. 2, an acquisition tier 200 according to an example embodiment is illustrated. In an example embodiment, the functionality of the acquisition tier 106 (see FIG. 1) may include the functionality of the acquisition tier 200.

A plurality of content sources 202.1-202.n may provide video content in the form of a video signal to a plurality of standard definition (SD) encoders 204.1-204.n and/or a plurality of high definition (HD) encoders 206.1-206.n. In an example embodiment, the functionality of the content sources 156 (see FIG. 1) may include the functionality of the plurality of content sources 202.1-202.n. In an example embodiment, the functionality of the plurality of SD encoders 204.1-204.n may be combined with the functionality of the plurality of HD encoders 206.1-206.n to create one or more unified encoders.

The plurality of SD encoders 204.1-204.n may encode video content as a plurality of SD full screen video signals 208.1-208.n (e.g., SD full resolution video signals) and a plurality of SD picture-in-picture (PIP) video signals 210.1-210.n. The plurality of HD encoders 206.1-206.n may encode video content as a plurality of HD full screen video signals 212.1-212.n (e.g., HD full resolution video signals). In an example embodiment, each video signal sent from the plurality of content sources 202.1-202.n to the plurality of SD encoders 204.1-204.n and the plurality of HD encoders 206.1-206.n may have the SD full screen video signal 208, the SD PIP video signal 210, and the HD full screen video signal 212.

In an example embodiment, the plurality of SD full screen video signals 208.1-208.n may be a standard definition television signal in a format such as a National Television Standards Committee (NTSC) video signal, however other video signals and/or audio signals such as PAL (Phase Alternation Line), SECAM (Systeme Electronique Couleur Avec Memoire), sequence of bitmaps or other signal formats that transport a sequence of images may also be used. For example, a data rate for the plurality of SD full screen video signals 208.1-208.n may be about 1.8 Mb/s, for the plurality of HD full screen video signals 212.1-212.n may be about 11 Mb/s and for the plurality of SD PIP video signals 210.1-210.n may be about 256 kb/s, however other data transmission rates may also be used.

In an example embodiment, the display device 118, 126, 310.1, 310.2 and/or the combination device 308 (see FIGS. 1 and 3) may display a full screen video signal (e.g., the SD full screen video signals 208.1-208.n and/or the HD full screen video signals 212.1-212.n) on an entire portion of a screen of the display device 118, 126, 310.1, 310.2 and/or the combination device 308 and a PIP video signal (e.g., the plurality of SD PIP video signals 210.1-210.n) may be displayed in a smaller portion of the screen.

The plurality of SD full screen video signals 208.1-208.n, the plurality of SD PIP video signals 210.1-210.n, and/or the plurality of HD full screen video signals 212.1-212.n may be provided to one or more switches/routers 214. In an example embodiment, the functionality of the switch/router 214 may include the functionality of the AQT switch 152 (see FIG. 1).

Figure 3:
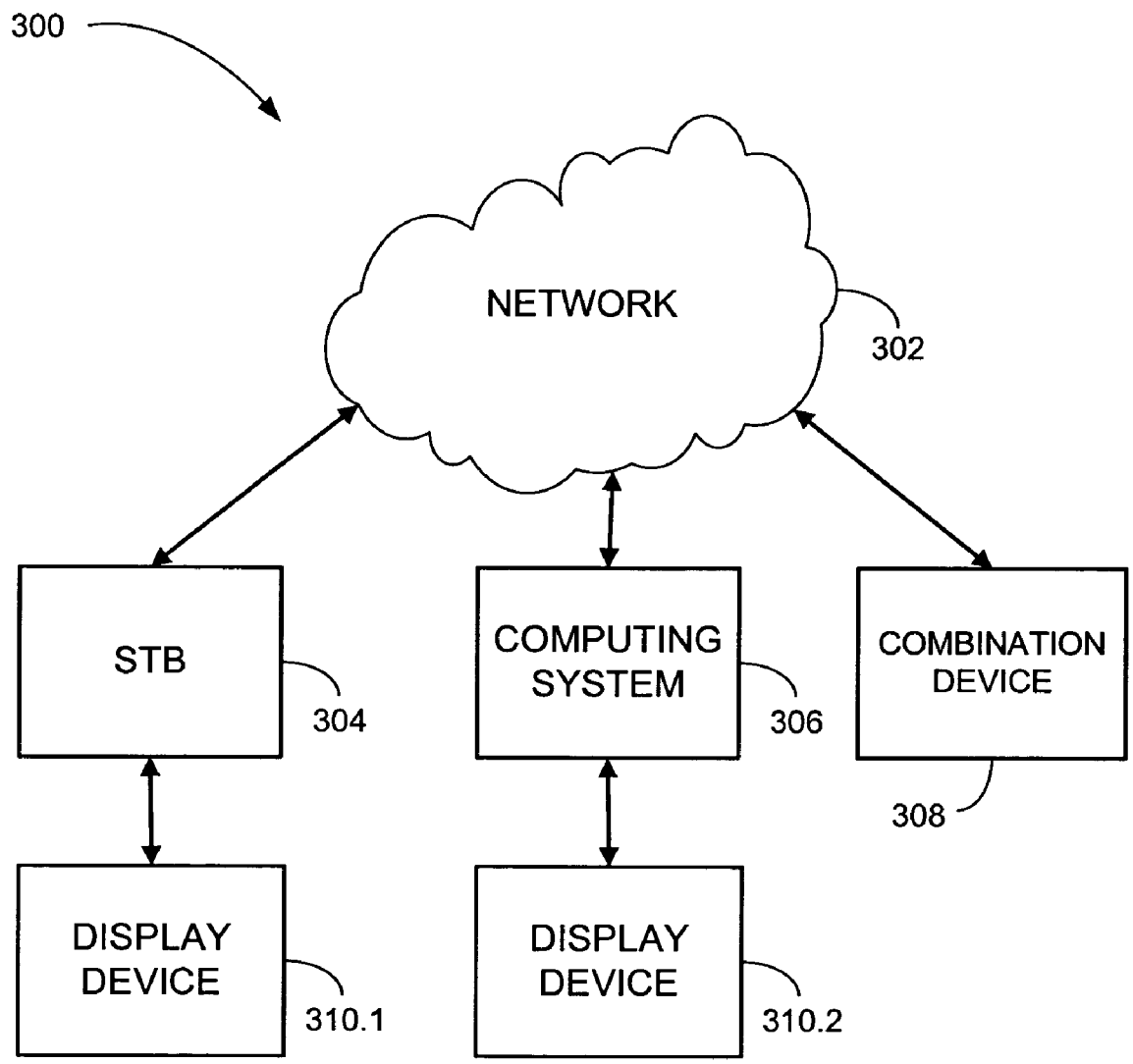
FIG. 3 is a block diagram of a distribution system according to an example embodiment.

Referring to FIG. 3, a distribution system 300 according to an example embodiment is illustrated. Video content in the form of one or more video signals may be received by a STB 304, a computing system 306, and/or a combination device 308 from a network 302. In an example embodiment, the functionality of the network 302 may include the functionality of the network 166 (see FIG. 1).

The STB 304 may provide one or more video signals to a display device 310.1. For example, STB 304 may be an access/control device and the display device 310.1 may be an authorized device, to enable a user of the STB 304 and the display device 310.1 to receive and present video signals and other content that the user is authorized to receive. In an example embodiment, the functionality of the STB 304 may include the functionality of the STBs 116, 124 (see FIG. 1).

The computing system 306 may provide one or more video signals to a display device 310.2. An implementation of the computing system 306 is described in greater detail below. For example, the computing system 306 may be an access/control device and the display device 310.2 may be an authorized device to enable a user of the computing system 306 and the display device 310.2 to receive and present video signals and other content that the user is authorized to receive.

In an example embodiment, the display devices 310.1, 310.2 may be devices capable of presenting video signals to a viewer such as an analog or digital television or computer monitor, however other devices may also be used.

The combination device 308 may include the functionality of receiving and processing video signals of the STB 304 and/or the computing system 306 in combination with the presentation functionality of the display devices 310.1, 310.2. For example, the combination device 308 may be a mobile phone, personal digital assistant (PDA), and/or other handheld or non-handheld device that may operation as both an access/control device and an authorized device.

Figure 4:
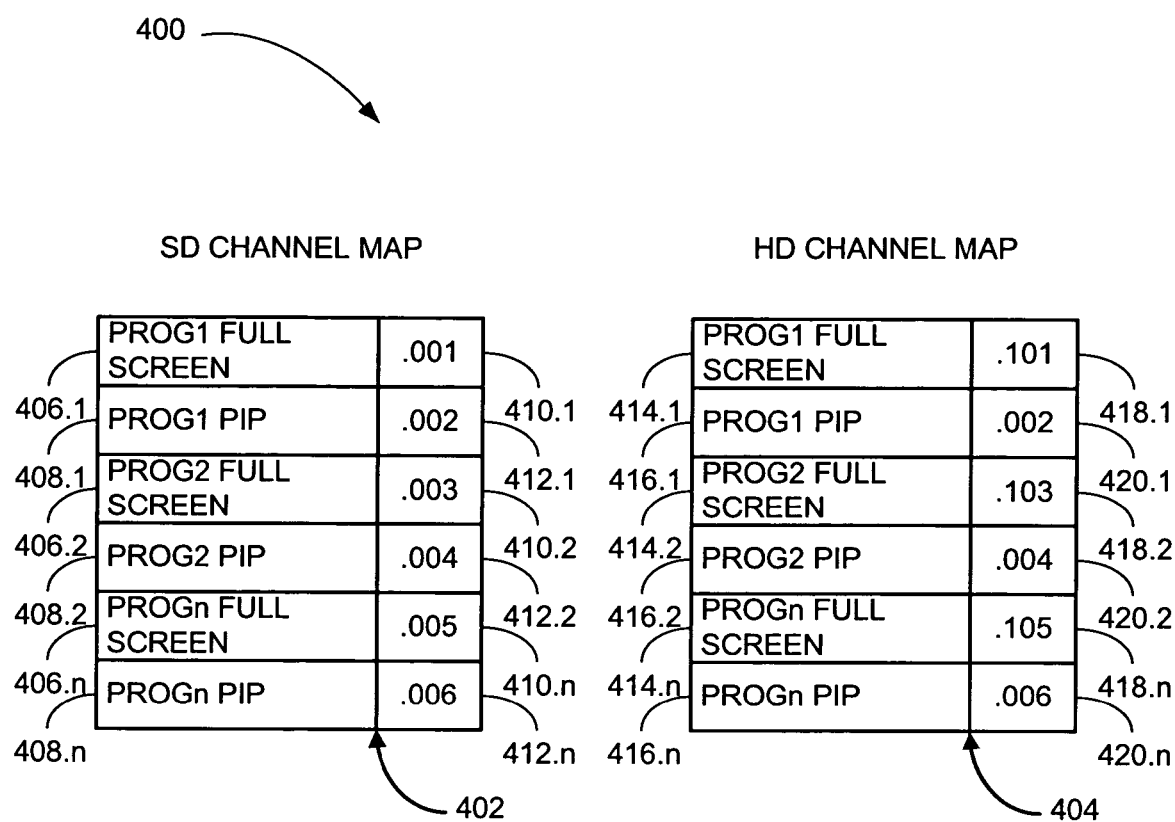
FIG. 4 is a block diagram of a channel map data structure according to an example embodiment.

Referring to FIG. 4, a channel map data structure 400 according to an example embodiment is illustrated. The channel map data structure 400 may be used by an access device (e.g., the functionality of which may be incorporated within the STB 304, computing system 306, and/or the combination device 308 of FIG. 3) to access a particular multicast video signal for video content. In an example embodiment, the channel map data structure 400 may be provided by the switch/router 214 (see FIG. 2) and/or generated on the access device.

As shown, the channel map data structure 400 may include a SD channel map 402 and a HD channel map 404. The SD channel map 402 may include a SD video signal identification column with a plurality of signal identification fields 406.1-406.$n$, 408.1-408.$n$ and a network identification column with a plurality of network identification fields 410.1-410.$n$, 412.1-412.$n$. The HD channel map 404 may include a HD video signal identification column with a plurality of network identification fields 414.1-414.$n$, 416.1-416.$n$ and a network identification column with a plurality of network identification fields 418.1-418.$n$, 420.1-420.$n$.

The SD channel map 402 may identify the plurality of SD full screen video signals 208.1-208.$n$ (see FIG. 2) within the plurality of the signal identification fields 406.1-406.$n$ and the plurality of SD PIP video signals 210.1-210.$n$ within the plurality of the signal identification fields 408.1-408.$n$. Each of the video signals identified in the signal identification fields 406.1-406.$n$, 408.1-408.$n$ may include a corresponding network address in the network identification fields 410.1-410.$n$, 412.1-412.$n$. For example, the network address may identify a location on a network (e.g., the network 302 of FIG. 3) of a corresponding video signal.

In an example embodiment, the location on the network may be a full IP address and/or the location on the network may be a last portion of an address (e.g., such as of an address starting with 255.0.0). Other embodiments including other unicast and/or multicast IP addresses may also be used.

The HD channel map 404 may identify the plurality of HD full screen video signals 212.1-212.$n$ (see FIG. 2) within the plurality of the signal identification fields 414.1-414.$n$ and the plurality of PIP video signals within the plurality of the signal identification fields 416.1-416.$n$. Each of the video signals identified in the signal identification fields 414.1-414.$n$, 416.1-416.$n$ may include a corresponding network address in the network identification fields 418.1-418.$n$, 420.1-420.$n$.

As shown in the channel map data structure 400, the network identification fields 420.1-420.$n$ for the PIP video signals of the HD channel map 404 may include same (e.g., identical) network addresses as the network identification fields 412.1-412.$n$ for the PIP video signals of the SD channel map 402. For example, an identical and/or a common network address may be assigned to a SD PIP multicast video signal for both SD PIP video content of the network identification fields 412.1-412.$n$ and HD video content of the network identification fields 420.1-420.$n$.

Figure 5:
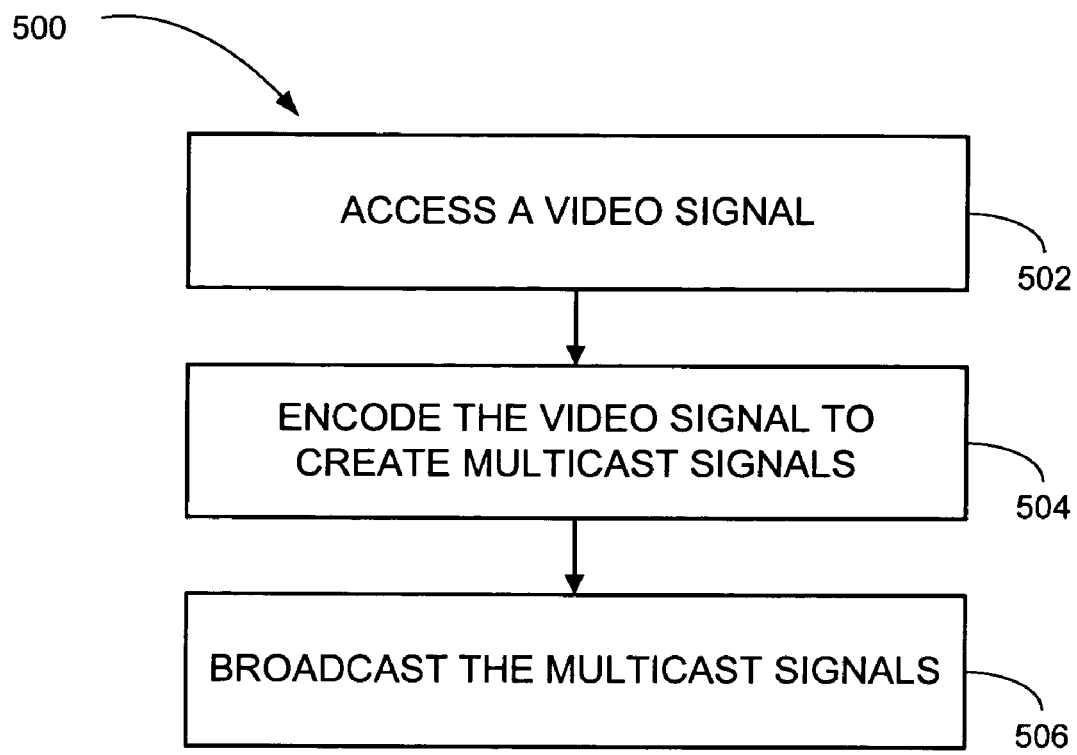
FIG. 5 is a flowchart illustrating a method in accordance with an example embodiment for broadcasting a video signal.

Referring to FIG. 5, a method 500 for broadcasting a video signal according to an example embodiment is illustrated. In an example embodiment, the method 500 may be performed within the acquisition tier 106, 200 (see FIGS. 1 and 2).

A video signal may be accessed from the content source 202 at block 502. The video signal may be encoded by the SD encoder 204 and/or the HD encoder 206 at block 504 to create one or more multicast signals. For example, the multicast signals for the encoded video signal may include the SD full screen multicast video signal 208, the SD PIP multicast video signal 210, and the HD full screen multicast video signal 212 (see FIG. 2). An example embodiment of encoding the video signal is described in greater detail below.

The multicast signals may be broadcast over the network 302 (see FIG. 3) at block 506. In an example embodiment, multiple video signals may be encoded and/or broadcast simultaneously.

Upon completion of the operations at block 506, the method 500 may terminate.

Figure 6:
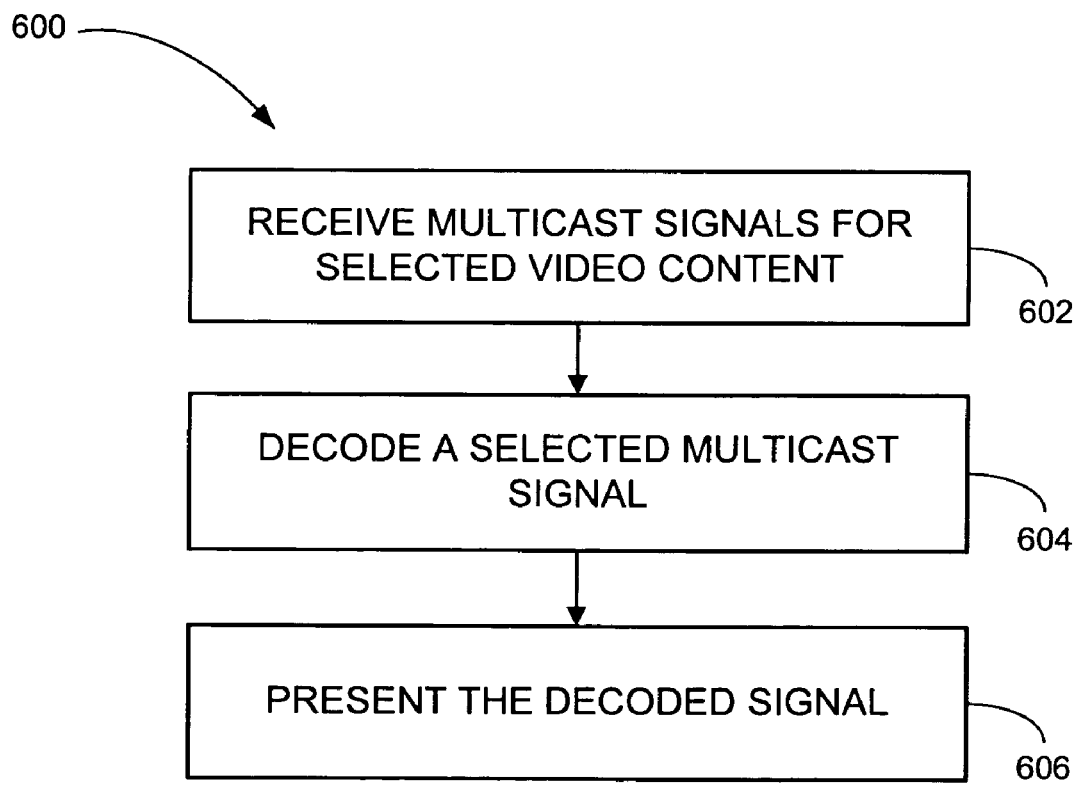
FIG. 6 is a flowchart illustrating a method in accordance with an example embodiment for presenting video content.

Referring to FIG. 6, a method 600 for presenting video content according to an example embodiment is illustrated. In an example embodiment, the method 600 may be performed within the distribution system 300 (see FIG. 3).

One or more multicast signals may be received (e.g., by an access/control device for an authorized device such as the STB 304, the computing system 306, and/or the combination device 308 of FIG. 3) for selected video content at block 602. For example, the multicast signals may include the SD full screen multicast video signal 208, the SD PIP multicast video signal 210, and/or the HD full screen multicast video signal 212 (see FIG. 2).

A selected multicast signal may be decoded (e.g., by the access/control device) at block 604. For example, the multicast signal may be selected for decoding by the access/control device based on a user's indication of the type of presentation desired on the authorized device and/or the capabilities of the authorized device. In an example embodiment, the access/control device may decode the selected multicast signal according a network address on the SD channel map 402 and/or the HD channel map 404 (see FIG. 4) associated with the access/control device. An example embodiment of selecting a multicast signal for decoding is described in greater detail below.

The decoded multicast signal may be presented at block 606. For example, the decoded multicast signal may be presented on the authorized device (e.g., the display device 310.1, 310.2 and/or the combination device 308 of FIG. 3).

In an example embodiment, when the authorized device is capable of presenting a video signal in high definition, the HD full screen multicast video signal 212 may be presented for primary video content on the authorized device and the SD PIP multicast video signal 210 may be presented for the picture-in-picture video content. Otherwise, the SD full screen multicast video signal 208 may be presented for primary video content on the authorized device and the SD PIP multicast video signal 210 may be presented for the picture-in-picture video content.

Figure 7:
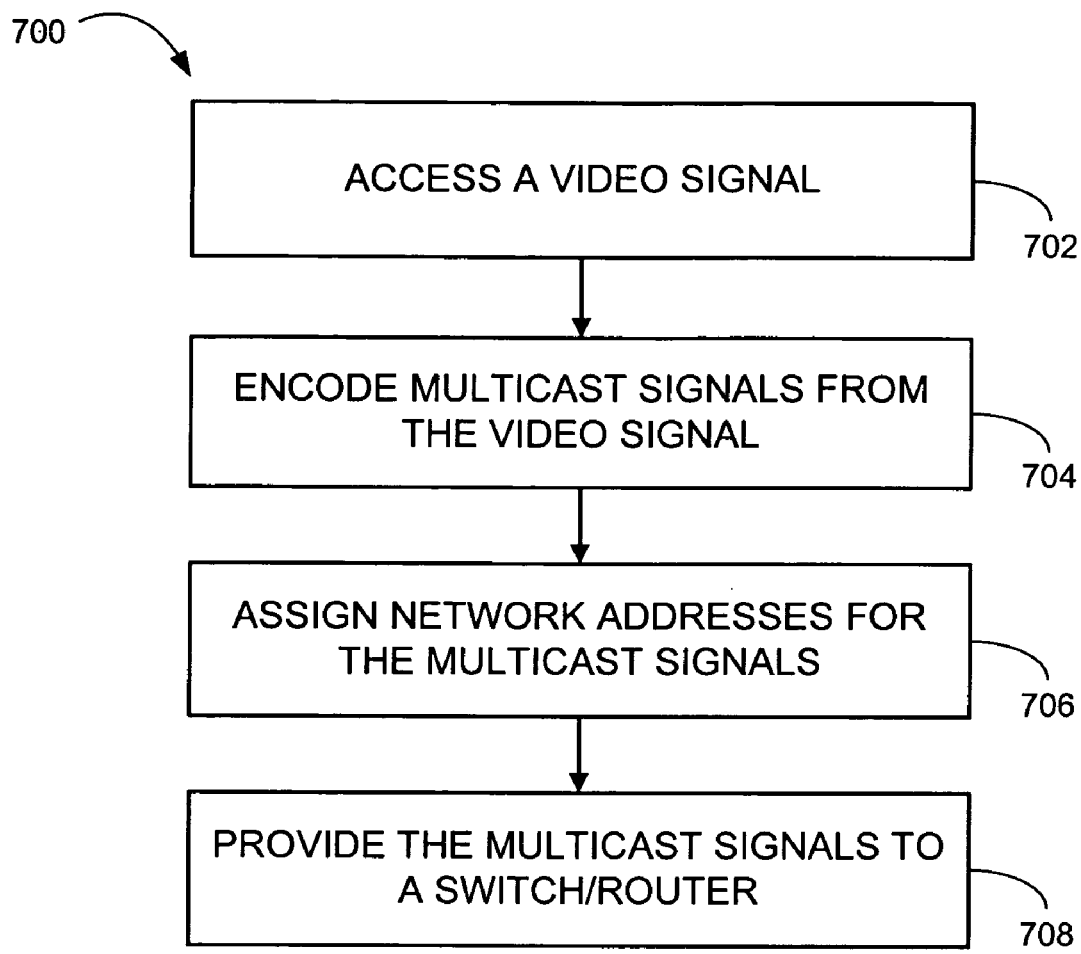
FIG. 7 is a flowchart illustrating a method in accordance with an example embodiment for encoding a video signal.

Referring to FIG. 7, a method 700 for encoding a video signal according to an example embodiment is illustrated. In an example embodiment, the method 700 may be performed at block 504 (see FIG. 5).

A video signal may be accessed (e.g., from the content source 202 of FIG. 2) at block 702. For example, the video signal may be accessed by the SD encoder 204 and/or the HD encoder 206 (see FIG. 2).

One or more multicast signals may be encoded from the video signal at block 704. For example, the SD full screen video signal 208 and the SD PIP video signal 210 may be encoded by the SD encoder 206 and the HD full screen video signal 212 may be encoded by the HD encoder 206 (see FIG. 2).

At block 706, network addresses may be assigned to the multicast signals. In an example embodiment, the network addresses may be internet protocol (IP) addresses, however other network addresses may also be used.

After completion of block 706, the multicast signals may be provided to the switch/router 214 (see FIG. 2). Upon completion of the block 706, the method 700 may terminate.

Figure 8:
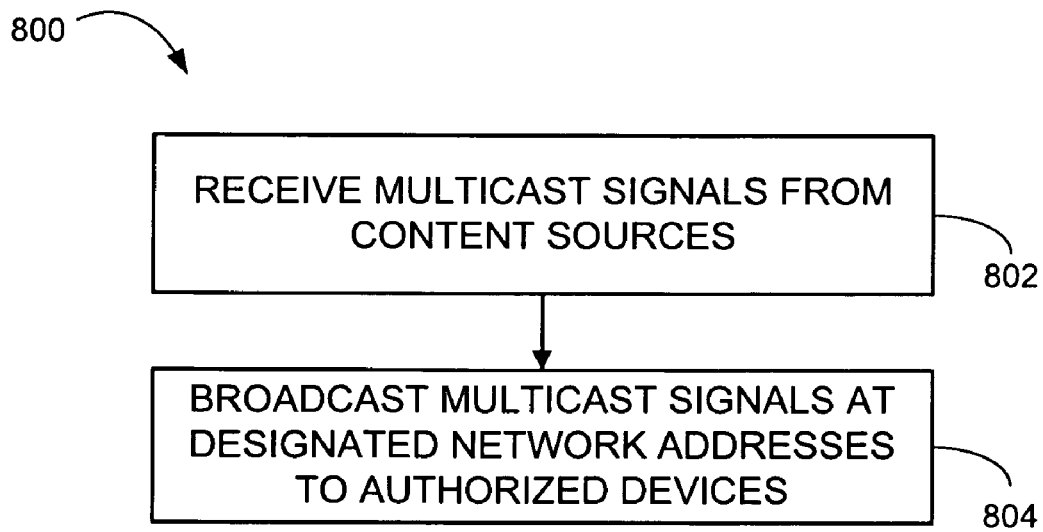
FIG. 8 is a flowchart illustrating a method in accordance with an example embodiment for processing multicast signals.

Referring to FIG. 8, a method 800 for processing multicast signals in accordance with an example embodiment is illustrated. In an example embodiment, the method 800 may be performed on the switch/router 214 (see FIG. 2).

Multicast signals may be received (e.g., on the switch/router 214) from the plurality of content sources 202.1-202.*n* (see FIG. 2) at block 802. The multicast signals may then be broadcast to the authorized devices at designated network addresses associated with the multicast signals at block 804. Upon completion of the operations at block 804, the method 800 may terminate.

Figure 9:
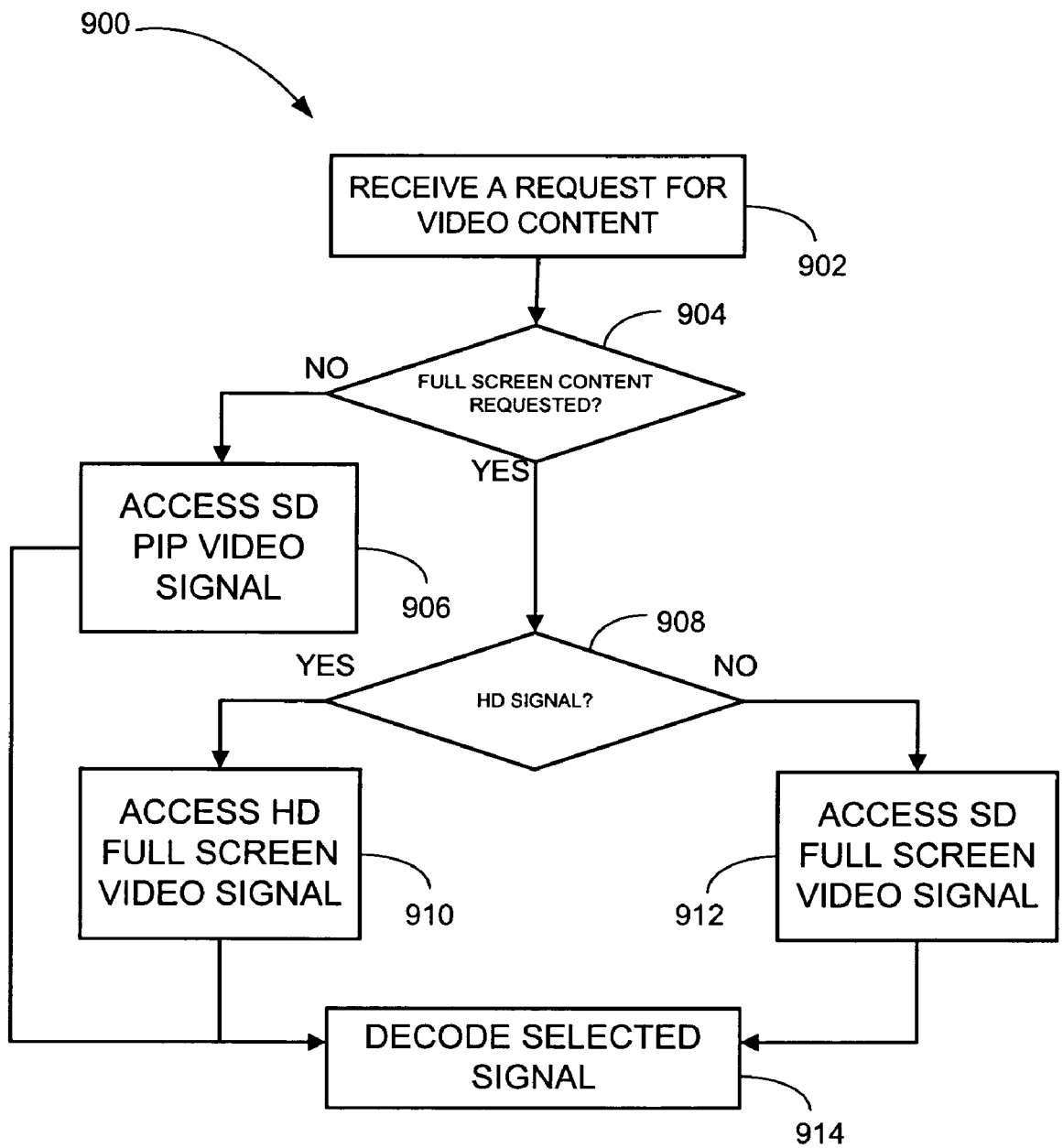
FIG. 9 is a flowchart illustrating a method in accordance with an example embodiment for decoding a multicast signal.

Referring to FIG. 9, a method 900 for decoding a multicast signal according to an example embodiment is illustrated. In an example embodiment, the method 900 may be performed at block 604 (see FIG. 6). In an example embodiment, the method 900 may be performed on the authorized device.

A request for video content may be received at block 902. For example, a user may request viewing video content as the full screen (e.g., full resolution) video content and/or the PIP video content. In an example embodiment, the video content may be a television show or movie, however types of video content may also be used.

At decision block 904, a determination may be made as to whether the full screen video content has been requested. If full screen content has not been requested, the SD PIP video signal 210 (see FIG. 2) may be accessed at block 906. For example, the SD PIP video signal 210 may be accessed according to a network address the channel map data structure 400 (see FIG. 4).

If full screen content has been request at decision block 904, a determination may be made as to whether the HD full screen video signal 212 (see FIG. 2) has been requested for the full screen content. If the HD full screen video signal 212 has been requested, the HD full screen video signal 212 may be accessed at block 910. If the HD full screen video signal 212 has not been requested at decision block 908, the SD full screen video signal 208 (see FIG. 2) may be accessed at block 912. In an example embodiment, the SD full screen video signal 208 and the HD full screen video signal 212 may each be accessed according to a network address the channel map data structure 400.

The selected video signal may be decoded at block 914 after the operations at block 906, block 910, or block 912 are complete. Upon completion of the operations at block 914, the method 900 may terminate.

In an example embodiment, the method 900 may selectively access a HD full screen video signal 212 in response a first request for HD full screen video content, selectively access a SD full screen video signal in response to a second request for SD full screen video content 208, and access a SD PIP video signal 210 in response to a third request for a HD PIP video content and/or a SD PIP video content.

Figure 10:
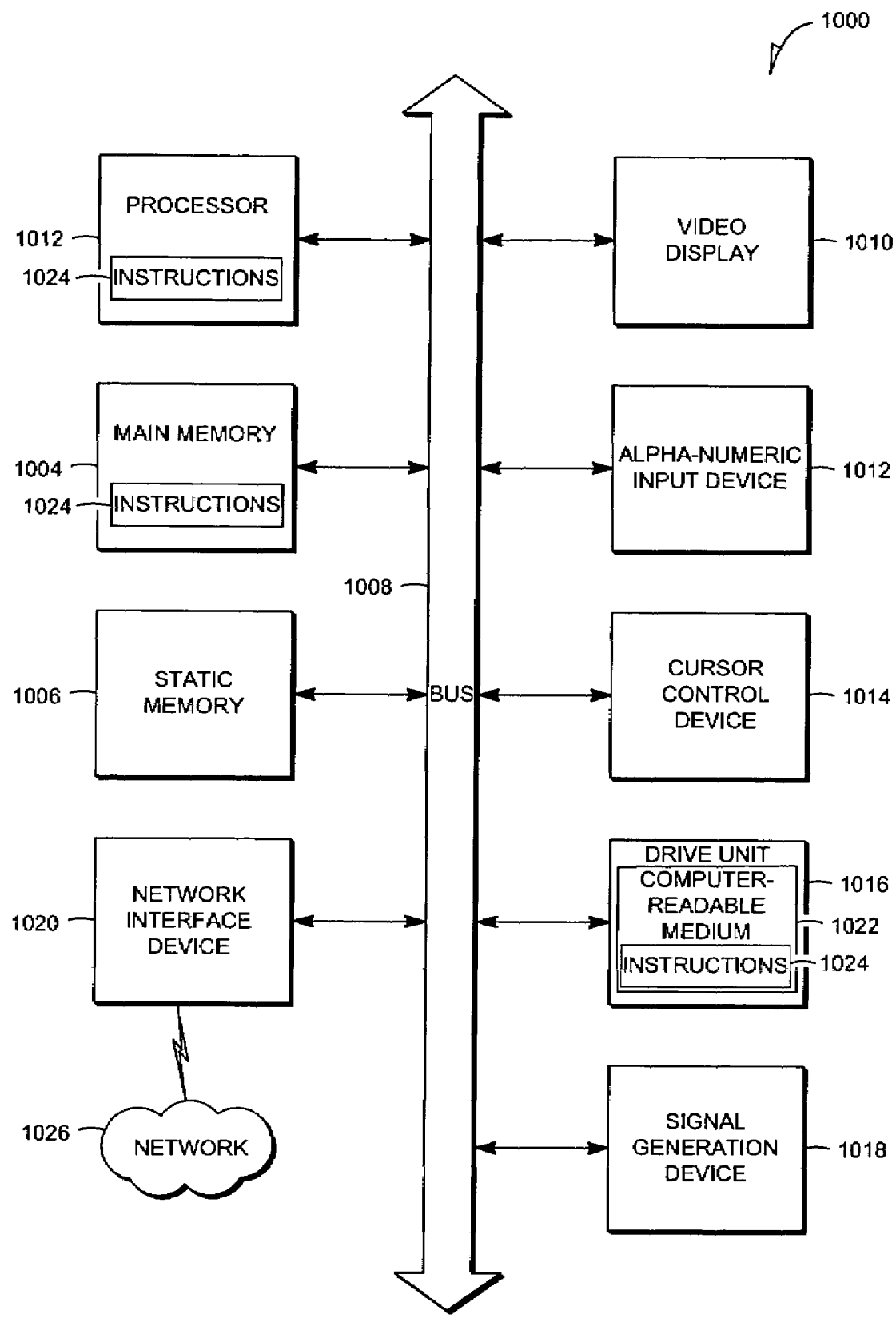
FIG. 10 illustrates a diagrammatic representation of machine in the example form of a computer system within which a set of instructions, for causing the machine to perform any one or more of the methodologies discussed herein, may be executed.

FIG. 10 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1012 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016 (e.g., a storage), a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1012 during execution thereof by the computer system 1000, the main memory 1004 and the processor 1012 also constituting machine-readable media.

The software 1024 may further be transmitted or received over a network 1026 via the network interface device 1020 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium"

shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    obtaining a video signal;
    encoding the video signal to generate a standard definition picture-in-picture multicast video signal;
    encoding the video signal to generate a high definition full screen multicast video signal;
    assigning an identical network address to a first network identification field of the standard definition picture-in-picture multicast video signal of a high definition channel map and to a second network identification field of the standard definition picture-in-picture multicast video signal of a standard definition channel map; and
    providing the standard definition picture-in-picture multicast video signal to a requesting device responsive to a request from the requesting device for high definition picture-in-picture video content.

2. The method of claim 1, further comprising:
    encoding the video signal to generate a standard definition full screen multicast video signal.

3. The method of claim 1, further comprising:
    providing the requesting device with channel map data comprising the identical network address, wherein the requesting device utilizes the channel map data to access the video signal.

4. The method of claim 2, further comprising:
    broadcasting the standard definition picture-in-picture multicast video signal, the high definition full screen multicast video signal and the standard definition full screen multicast video signal over an Internet Protocol Television network.

5. A method comprising:
    selectively accessing a high definition full screen video signal from a server in response to a first request for high definition full screen video content;
    selectively accessing a standard definition full screen video signal in response to a second request for standard definition full screen video content;
    accessing only a standard definition picture-in-picture video signal in response to a third request for high definition picture-in-picture video content; and
    wherein an identical network address is assigned to a first network identification field of the standard definition picture-in-picture video signal of a high definition channel map and to a second network identification field of the standard definition picture-in-picture video signal of a standard definition channel map.

6. The method of claim 5, further comprising:
    decoding an accessed video signal comprising at least one of the high definition full screen video signal, the standard definition full screen video signal or the standard definition picture-in-picture video signal to produce a decoded video signal; and
    presenting the decoded video signal on a display device.

7. The method of claim 5, further comprising accessing the standard definition picture-in-picture video signal utilizing channel map data comprising the identical network address associated with the standard definition picture-in-picture video signal, wherein the channel map data is stored in a memory of a set-top box.

8. The method of claim 7, wherein the identical network address associated with the standard definition picture-in-picture video signal is different from a first network address associated with the high definition full screen video signal and a second network address associated with the standard definition full screen video signal.

9. The method of claim 5, further comprising selectively accessing the high definition full screen video signal based on a first network address associated with the high definition full screen video signal that is different from the identical network address associated with the standard definition picture-in-picture video signal.

10. A system comprising:
    a first device to broadcast over an internet protocol television network a standard definition full screen video signal for standard definition full screen video content at a first network address, a high definition full screen video signal for high definition full screen video content at a second network address, and only a standard definition picture-in-picture video signal responsive to a request for high definition video content at a third network address, wherein an identical network address is assigned to a first network identification field of the standard definition picture-in-picture video signal of a high definition channel map and to a second network identification field of the standard definition picture-in-picture video signal of a standard definition channel map.

11. The system of claim 10, wherein the first device comprises at least one of a switch and a router.

12. The system of claim 10, further comprising:
a high definition encoder to encode video content to generate the high definition full screen video signal; and
a standard definition encoder to encode the video content to generate the standard definition full screen video signal.

13. The system of claim 12, wherein the first device provides a channel map data structure to a set top box to enable the set top box to access the standard definition picture-in-picture video signal.

14. A computer-readable medium having stored thereon a data structure, the data structure comprising:
standard definition picture-in-picture network identification fields to identify a first network address for video content;
standard definition full screen network identification fields to identify a second network address for the video content; and
high definition full screen network identification fields to identify a third network address for the video content;
wherein the first network address is adapted to provide only a standard definition picture-in-picture multicast video signal responsive to a request for high definition picture-in-picture video content, and wherein an identical network address is assigned to a first field of the standard definition picture-in-picture network identification fields of the standard definition picture-in-picture multicast video signal of a high definition channel map and to a second field of the standard definition picture-in-picture network identification fields of the standard definition picture-in-picture multicast video signal of a standard definition channel map.

15. The computer-readable medium of claim 14, wherein the data structure further comprises:
high definition picture-in-picture network identification fields to identify the first network address for the video content.

16. The computer-readable medium of claim 14, wherein each of the first, the second and the third network addresses is an internet protocol address on an internet protocol television network.

17. A computer-readable medium comprising instructions, which when executed by a machine, cause the machine to:
encode a standard definition picture-in-picture multicast video signal from a video signal;
encode a high definition full screen multicast video signal from the video signal; and
supply a requesting device the standard definition picture-in-picture multicast video signal responsive to a request from the requesting device for high definition picture-in-picture video content, wherein an identical network address is assigned to a first network identification field of the standard definition picture-in-picture multicast video signal of a high definition channel map and to a second network identification field of the standard definition picture-in-picture multicast video signal of a standard definition channel map.

18. The computer-readable medium of claim 17 further comprising instructions to:
encode a standard definition full screen multicast video signal from the video signal.

19. The computer-readable medium of claim 18 further comprising instructions to:
supply the standard definition picture-in-picture multicast video signal based on the identical network address being different from a first network address associated with the high definition full screen multicast video signal.

20. The computer-readable medium of claim 18 further comprising instructions to:
broadcast the standard definition picture-in-picture multicast video signal, the high definition full screen multicast video signal, and the standard definition full screen multicast video signal over an Internet Protocol Television network.

21. A computer-readable medium comprising instructions, which when executed by a machine, cause the machine to:
selectively access a high definition full screen video signal in response to a first request for HD full screen video content;
selectively access a standard definition full screen video signal in response to a second request for standard definition full screen video content; and
access only a standard definition picture-in-picture video signal in response to a third request for high definition picture-in-picture video content, wherein an identical network address is assigned to a first network identification field of the standard definition picture-in-picture video signal of a high definition channel map and to a second network identification field of the standard definition picture-in-picture video signal of a standard definition channel map.

22. The computer-readable medium of claim 21 further comprising instructions to:
decode an accessed video signal comprising the standard definition picture-in-picture video signal to produce a decoded video signal; and
present the decoded video signal on a display device.

23. The computer-readable medium of claim 21, wherein the standard definition picture-in-picture video signal is accessed using channel map data that identifies network addresses for high definition full screen video signal, the standard definition full screen video signal, and the standard definition picture-in-picture video signal, wherein the channel map data is stored in a memory of a mobile device that is transmitting the third request.

* * * * *